US011446982B2

(12) United States Patent
Seo et al.

(10) Patent No.: US 11,446,982 B2
(45) Date of Patent: Sep. 20, 2022

(54) USER BODY TEMPERATURE ASSISTANCE SYSTEM ASSOCIATED WITH VEHICLE AIR CONDITIONING SYSTEM

(71) Applicants: Hyundai Motor Company, Seoul (KR); Kia Motors Corporation, Seoul (KR)

(72) Inventors: Sang Ki Seo, Hwaseong-si (KR); Yong Chul Kim, Hwaseong-si (KR); June Kyu Park, Hwaseong-si (KR); Ju Ho Choi, Hwaseong-si (KR); Doo Ri Kim, Goyang-si (KR); Hyeong Jun Kim, Anyang-si (KR); Sung Hae Park, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 174 days.

(21) Appl. No.: 16/431,582

(22) Filed: Jun. 4, 2019

(65) Prior Publication Data

US 2020/0130461 A1 Apr. 30, 2020

(30) Foreign Application Priority Data

Oct. 26, 2018 (KR) .................. 10-2018-0128905

(51) Int. Cl.
*B60H 1/00* (2006.01)
(52) U.S. Cl.
CPC ..... *B60H 1/00742* (2013.01); *B60H 1/00285* (2013.01)

(58) Field of Classification Search
CPC ............ B60H 1/00742; B60H 1/00292; B60H 1/00285; B60N 2/5678
See application file for complete search history.

(56) References Cited

U.S. PATENT DOCUMENTS

| 6,672,085 B1 * | 1/2004 | Sangwan ............... B60H 1/008 62/126 |
| 6,745,947 B2 | 6/2004 | Aoki et al. |
| 10,279,650 B2 * | 5/2019 | Maranville ........ B60H 1/00971 |
| 2012/0234815 A1 * | 9/2012 | Willey ................. B60N 2/5685 219/202 |

(Continued)

FOREIGN PATENT DOCUMENTS

| JP | H07-276968 A | 10/1995 |
| KR | 95-0026729 A | 10/1995 |

(Continued)

*Primary Examiner* — Steven S Anderson, II
(74) *Attorney, Agent, or Firm* — Morgan, Lewis & Bockius LLP

(57) ABSTRACT

A user body temperature assistance system associated with an air conditioning device, may include air conditioning controller configured to control an operation of an air conditioning device configured for adjusting an interior air temperature of a vehicle and determine an operation stage of a temperature adjustment unit in the vehicle according to an operation-based signal of the air conditioning device; and a temperature adjustment controller, which is configured to control an operation of the temperature adjustment unit for assisting a user body temperature according to the operation stage determined by the air conditioning controller.

17 Claims, 6 Drawing Sheets

(56) References Cited

U.S. PATENT DOCUMENTS

2014/0117104 A1* 5/2014 Inaba .................... B60H 1/02
                                                               237/28
2018/0208017 A1* 7/2018 Hernandez ......... B60H 1/00985
2019/0256125 A1* 8/2019 Ostrowski ............... B62D 1/06

FOREIGN PATENT DOCUMENTS

| KR | 10-1105028 B1 | 1/2012 |
| KR | 10-2012-0071688 A | 7/2012 |
| KR | 10-1527052 B1 | 6/2015 |
| KR | 10-1677454 B1 | 11/2016 |
| KR | 10-1721484 B1 | 3/2017 |

\* cited by examiner

USER BODY TEMPERATURE ASSISTANCE SYSTEM ASSOCIATED WITH VEHICLE AIR CONDITIONING SYSTEM

CROSS-REFERENCE TO RELATED APPLICATION

The present application claims priority to Korean Patent Application No. 10-2018-0128905 filed on Oct. 26, 2018, the entire contents of which is incorporated herein for all purposes by this reference.

BACKGROUND

Field of the Invention

The present invention relates to a user body temperature assistance system associated with an air conditioning device. More particularly, it relates to a user body temperature assistance system of a vehicle, which is capable of improving user convenience during boarding and driving.

Description of Related Art

Generally, an air conditioning device for adjusting a temperature of interior air is provided at a vehicle, and in recent years, a heating wire is also disposed at a seat and a steering wheel of the vehicle so that a passenger can feel comfort during winter season.

However, since the air conditioning device and the heating wire are individually controlled, an interior temperature of the vehicle may be good, whereas temperatures of the seat and the steering wheel may be cold so that there is an inconvenience for a passenger aboard the vehicle should directly operate the heating wires of the seat and the steering wheel.

Furthermore, when a driver changes the temperatures of the seat and the steering wheel while driving, there is a problem in that driving visibility is distracted and driving safety is degraded.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a user body temperature assistance system associated with an air conditioning device, which is configured for automatically controlling an operation of a user body temperature assistance unit according to an operating load (thermal load) of an air conditioning device configured for controlling interior air of a vehicle by configuring the user body temperature assistance unit provided at the vehicle to be operate in conjunction with the air conditioning device.

Various aspects of the present invention are directed to providing a user body temperature assistance system associated with an air conditioning device, which may include air conditioning controller configured to control an operation of an air conditioning device configured for adjusting an interior air temperature of a vehicle and determine an operation stage of a temperature adjustment unit in the vehicle according to an operation-based signal of the air conditioning device, and a temperature adjustment controller, which is configured to control an operation of the temperature adjustment unit for assisting a user body temperature according to the operation stage determined by the air conditioning controller.

The air conditioning controller may be configured to determine a required calorie index of the air conditioning device on the basis of the operation-based signal and determine an operation stage of the temperature adjustment unit according to the determined required calorie index.

The temperature adjustment controller may include a seat controller configured to control an operation of a seat temperature adjustment unit for adjusting a temperature of a seat, and a steering wheel controller configured to control an operation of a steering wheel temperature adjustment unit for adjusting a temperature of a steering wheel.

The temperature adjustment unit may be controlled in either an interlocked control mode in which the temperature adjustment unit is controlled according to a required calorie index of the air conditioning device or a manual control mode in which the temperature adjustment unit is manually controlled according to a user input signal, and the control mode of the temperature adjustment unit may be set through a user interface unit in the vehicle.

The user interface unit may include an air conditioning interlocking manipulation module configured to set or release an interlocking operation between the air conditioning device and the temperature adjustment unit, a seat manipulation module configured to receive a user input signal for manual control of the seat temperature adjustment unit, and a steering wheel manipulation module configured to receive a user input signal for manual control of the steering wheel temperature adjustment unit.

When a control mode of the temperature adjustment unit is an interlocked control mode in which the temperature adjustment unit is controlled by being interlocked with the operation of the air conditioning device, the temperature adjustment controller may control the operation stage of the temperature adjustment unit according to a request of the air conditioning controller.

When the control mode of the temperature adjustment unit is the interlocked control mode and a user input signal for controlling the operation of the temperature adjustment unit is generated, the temperature adjustment controller may switch the control mode of the temperature adjustment unit to a manual control mode in which the temperature adjustment unit is manually controlled according to the user input signal. When the control mode of the temperature adjustment unit is switched from the interlocked control mode to the manual control mode, the temperature adjustment controller may maintain an operation stage of the temperature adjustment unit in the interlocked control mode.

When the temperature adjustment unit is operated in the interlocked control mode at a set operation stage for a predetermined reference time or more, the temperature adjustment controller may automatically descend the set operation stage of the temperature adjustment unit.

When the control mode immediately before a starting of the vehicle is the manual control mode and the starting of the vehicle is turned on again, the temperature adjustment unit may be controlled to be operated at the operation stage in the manual control mode.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
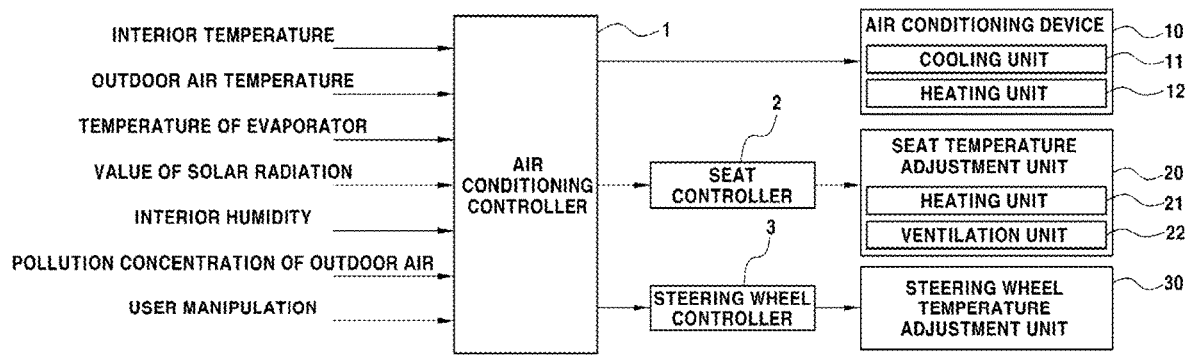
FIG. 1 is a diagram illustrating a configuration of a user body temperature assistance system of a vehicle according to an exemplary embodiment of the present invention.

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the present invention will be described in conjunction with exemplary embodiments of the present invention, it will be understood that present description is not intended to limit the present invention to those exemplary embodiments. On the contrary, the present invention is intended to cover not only the exemplary embodiments of the present invention, but also various alternatives, modifications, equivalents and other embodiments, which may be included within the spirit and scope of the present invention as defined by the appended claims.

Hereinafter, the present invention will be described to allow those skilled in the art to easily practice the present invention.

A user body temperature assistance system of a vehicle according to an exemplary embodiment of the present invention includes a user body temperature assistance unit operated in conjunction with an air conditioning device 10 for controlling an air temperature in the vehicle. As shown in FIG. 1, the user body temperature assistance system may include an air conditioning controller 1 disposed at the vehicle, a seat controller 2, a steering wheel controller 3, a seat temperature adjustment unit 20, and a steering wheel temperature adjustment unit 30.

The air conditioning device 10 is provided to keep interior air of the vehicle pleasant through air-conditioning and is configured to discharge temperature-controlled air into a vehicle interior. The air conditioning device 10 may include a heating unit 12 for heating air and supplying the heated air to the vehicle interior, and a cooling unit 11 for cooling air and supplying the cooled air to the vehicle interior. An operation stage of the heating unit 12 and an operation stage of the cooling unit 11 may be controlled according to an operation-based signal of the air conditioning device 10, which is input to the air conditioning controller 1. Furthermore, a temperature of the air heated by the heating unit 12 and a temperature of the air cooled by the cooling unit 11 may be determined according to the operation stage. The air conditioning device 10 is configured for assisting a body temperature of a user aboard the vehicle by adjusting a temperature of the vehicle interior.

The operation-based signal of the air conditioning device 10 includes signals such as a vehicle internal temperature, a vehicle outdoor air temperature, an evaporator temperature, a value of solar radiation, vehicle internal humidity, a pollution concentration of the vehicle outdoor air, a user input, and the like. The evaporator temperature is a temperature of an evaporator included in the cooling unit 11, the value of solar radiation is a value of solar radiation incoming into the vehicle interior, and the pollution concentration of the vehicle outdoor air is a dust concentration measured by a dust sensor disposed outside the vehicle.

The air conditioning controller 1 may automatically or manually control an operation of the air conditioning device 10 and may control according to the operation-based signal of the air conditioning device 10 by determining whether the air conditioning device 10 is operated and the operation stage of the air conditioning device 10. When operation-based signal including a signal input by a user (user input signal) is used to control the operation of the air conditioning device 10, the air conditioning controller 1 may manually control the operation of the air conditioning device 10, and when the operation-based signal is used except for the user input signal, the air conditioning controller 1 may automatically control the operation of the air conditioning device 10. The air conditioning controller 1 is configured to determine a required calorie index value corresponding to a thermal load (i.e., an operating load) of the air conditioning device 10 on the basis of the operation-based signal. That is, the air conditioning controller 1 may determine the required calorie index value on the basis of the operation-based signal. For example, the air conditioning controller 1 may determine a required calorie index of the air conditioning device 10 through a pre-built required calorie index determination map. The required calorie index determination map is configured to determine a required calorie index value on the basis of the operation-based signal.

On the basis of the required calorie index value, the air conditioning controller 1 may determine operation stages of the cooling unit 11 and the heating unit 12 and, simultaneously, operation stages of the seat temperature adjustment unit 20 and the steering wheel temperature adjustment unit 30. Furthermore, the air conditioning controller 1 requests the seat controller 2 to operate the seat temperature adjustment unit 20 according to the operation stage and requests the steering wheel controller 3 to operate the steering wheel temperature adjustment unit 30 according to the operation stage.

The seat controller 2 is a controller for a temperature adjustment unit and is configured to control the operation of the seat temperature adjustment unit 20 according to the request of the air conditioning controller 1. That is, the seat controller 2 may control the operation of the seat temperature adjustment unit 20 on the basis of a request signal transmitted from the air conditioning controller 1. In other words, the air conditioning controller 1 may determine the operation stage of the seat temperature adjustment unit 20 according to the required calorie index value, and the seat controller 2 may control the operation of the seat temperature adjustment unit 20 according to the operation stage.

The seat temperature adjustment unit 20 is provided to adjust a temperature of a seat on which the user sits to assist a user body temperature and includes a seat heating unit 21 for heating the seat and a seat ventilation unit 22 for ventilating the seat. The seat heating unit 21 may be operated according to the operation stage determined by the air conditioning controller 1, and an operation strength (i.e., a temperature for heating the seat) may be determined according to the operation stage. The seat ventilation unit 22 may be operated according to the operation stage determined by the air conditioning controller 1, and an operation strength (i.e., a ventilation flow rate supplied to the seat) may be determined according to the operation stage. The seat heating unit 21 may include a plurality of heating wires disposed at a seat cushion and a seatback, and the seat ventilation unit 22 may include an air blower for blowing air to the seat cushion and the seat back. The seat ventilation unit 22 may adjust a seat temperature, seat humidity, and the like according to a temperature of the air blown to the seat cushion and the seat back.

The steering wheel controller 3 is a controller for a temperature adjustment unit and is configured to control the operation of the steering wheel temperature adjustment unit 30 according to the request of the air conditioning controller 1. In other words, the steering wheel controller 3 may control the operation of the steering wheel temperature adjustment unit 30 on the basis of a request signal transmitted from the air conditioning controller 1. In other words, the air conditioning controller 1 may determine an operation stage of the steering wheel temperature adjustment unit 30 according to a required calorie index value, and the steering wheel controller 3 may control the operation of the steering wheel temperature adjustment unit 30 according to the operation stage.

The steering wheel temperature adjustment unit 30 is configured to adjust a temperature of a steering wheel held when the user drives to assist the user body temperature. The steering wheel temperature adjustment unit 30 may include a steering wheel heating unit for heating the steering wheel. Furthermore, the steering wheel heating unit may include a plurality of heating wires disposed at the steering wheel. The steering wheel temperature adjustment unit 30 may be operated according to the operation stage determined by the air conditioning controller 1, and an operation strength (i.e., a temperature for heating the steering wheel) may be determined according to the operation stage. In other words, the temperature at which the steering wheel temperature adjustment unit 30 heats the steering wheel may be determined according to the operation stage.

Figure 4:
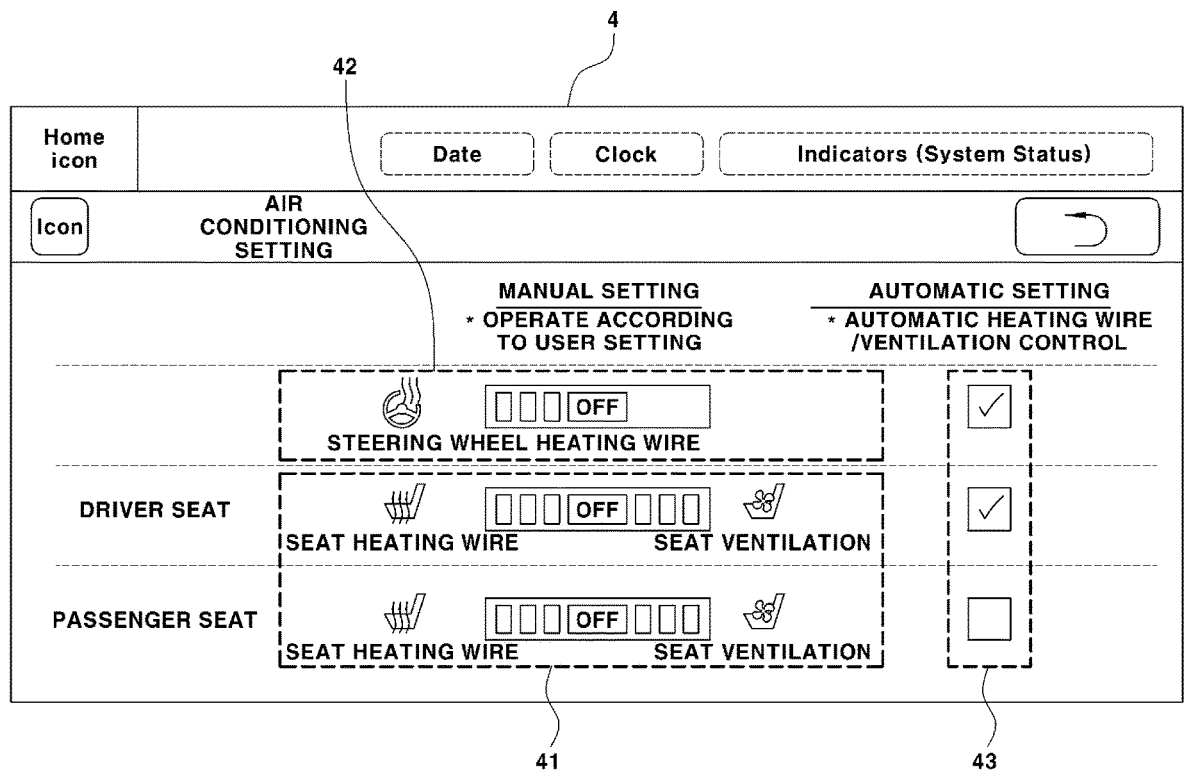
FIG. 4 is a diagram illustrating an example of a user interface unit according to an exemplary embodiment of the present invention.

In the vehicle interior, a user interface unit 4 of the user body temperature assistance system may include an air conditioning manipulation module for receiving a user input signal for manual control of the air conditioning device 10, a seat manipulation module 41 for receiving the user input signal for manual control of the seat temperature adjustment unit 20, a steering wheel manipulation module 42 for receiving the user input signal for manual control of the steering wheel temperature adjustment unit 30, and an air conditioning interlocking manipulation module 43 for setting or releasing an interlocking operation between the air conditioning device 10 and the temperature adjustment units 20 and 30 (see FIG. 4). The manipulation modules 41, 42, and 43 may be configured in various forms such as a button type module, a dial type module, a touch type module, and the like to receive the user input signals. The user may control ON/OFF operations and an operation stage of the air conditioning device 10 using the air conditioning manipulation module, may control ON/OFF operations and an operation stage of the seat temperature adjustment unit 20 using the seat manipulation module 41, may control ON/OFF operations and an operation stage of the steering wheel temperature adjustment unit 30 using the steering wheel manipulation module 42, and may set whether the temperature adjustment units 20 and 30 and the air conditioning device 10 are interlocked using the air conditioning interlocking manipulation module 43. When the user interface unit 4 is configured as a touch type unit, the user interface unit 4 may be provided at a display device of a vehicle infotainment. For example, the seat manipulation module 41, the steering wheel manipulation module 42, and the air conditioning interlocking manipulation module 43 may be integrated into a touch type manipulation module (an audio, video, and navigation (AVN) display) of an AVN system disposed at the vehicle interior. That is, the user interface unit 4 may include a user session management (USM) item displayed and output on the AVN display.

FIG. 4 illustrates an example of a case in which the user interface unit 4 including the seat manipulation module 41, the steering wheel manipulation module 42, and the air conditioning interlocking manipulation module 43 is integrated into the touch type manipulation module of an AVN system.

Referring to FIG. 4, in the user interface unit 4 of the touch type manipulation module, when a portion displayed as "Seat Heating Wire" of a displayed region in the seat manipulation module 41 is touched, an operation stage may gradationally increase by one stage whenever the portion displayed as "Seat Heating Wire" is touched and, after a maximum operation stage (Stage 3), the seat manipulation module 41 may be switched to an OFF state, and when a portion displayed as "Seat Ventilation" is touched, an operation stage may gradationally increase by one stage whenever the portion displayed as "Seat Ventilation" is touched and, after a maximum operation stage (Stage 3), the seat manipulation module 41 may be switched to an OFF state. Furthermore, in the user interface unit 4 of the touch type manipulation module, when a portion displayed as "Steering Wheel Heating Wire" a displayed region in the steering wheel manipulation module 42 is touched, an operation stage may gradationally increase by one stage whenever the portion displayed as "Steering Wheel Heating Wire" is touched and, after a maximum operation stage (Stage 2), the steering wheel manipulation module 42 may be switched to an OFF state. Furthermore, whenever an indication column of a displayed region as the air conditioning interlocking manipulation module 43 in the touch type manipulation module is touched, the settings of the temperature adjustment units 20 and 30 may be switched. That is, whenever the indication columns are touched, the settings of the temperature adjustment units 20 and 30 may be set to an interlocked control mode, or the interlocked control mode of each of the temperature adjustment units 20 and 30 may be released. For example, when the steering wheel temperature adjustment unit 30 is in the interlocked control mode and an indication column disposed at a right side among the indication columns of the steering wheel manipulation module 42 is touched, the interlocked control mode of the steering wheel temperature adjustment unit 30 is released.

Using the user interface unit 4 of the above-described touch type manipulation module, each of the seat heating unit 21, the seat ventilation unit 22, and the steering wheel temperature adjustment unit 30 may be set to an interlocked control mode (or an automatic control mode) or a manual control mode. Furthermore, the touch type manipulation module may display an item selected by a user input (a user touch). In other words, the touch type manipulation module may display information (user selection items) such as interlocked control modes, manual control modes, and operation stages of the temperature adjustment units 20 and 30.

The user may select and determine whether to interlock the seat temperature adjustment unit 20 or the steering wheel temperature adjustment unit 30 to the operation of the air conditioning device 10 using the air conditioning interlocking manipulation module 43. When the temperature adjustment units 20 and 30 are set to the interlocked control mode, the temperature adjustment units 20 and 30 are operated to be interlocked with the operation of the air conditioning device 10. In other words, when the temperature adjustment units 20 and 30 are set to the interlocked control mode, the operation stage may be controlled according to a required calorie index of the air conditioning device 10.

When the temperature adjustment units 20 and 30 are set to the manual control mode, the temperature adjustment units 20 and 30 are separately operated from the operation of the air conditioning device 10 and the required calorie index thereof. When the temperature adjustment units 20 and 30 are operated in the manual control mode, the temperature adjustment units 20 and 30 are operated according to an operation stage set by the user or are switched to an OFF mode. That is, when the temperature adjustment units 20 and 30 are operated in the manual control mode, the temperature adjustment units 20 and 30 are manually controlled according to a user input signal which is input to the user interface unit 4. When a control mode of each of the temperature adjustment units 20 and 30 is in the manual control mode, the user may control an operation stage of the seat temperature adjustment unit 20 and an operation stage of the steering wheel temperature adjustment unit 30 using the seat manipulation module 41 and the steering wheel manipulation module 42. Furthermore, the OFF mode may be regarded as when the operation stage is Stage zero.

Figure 2A:
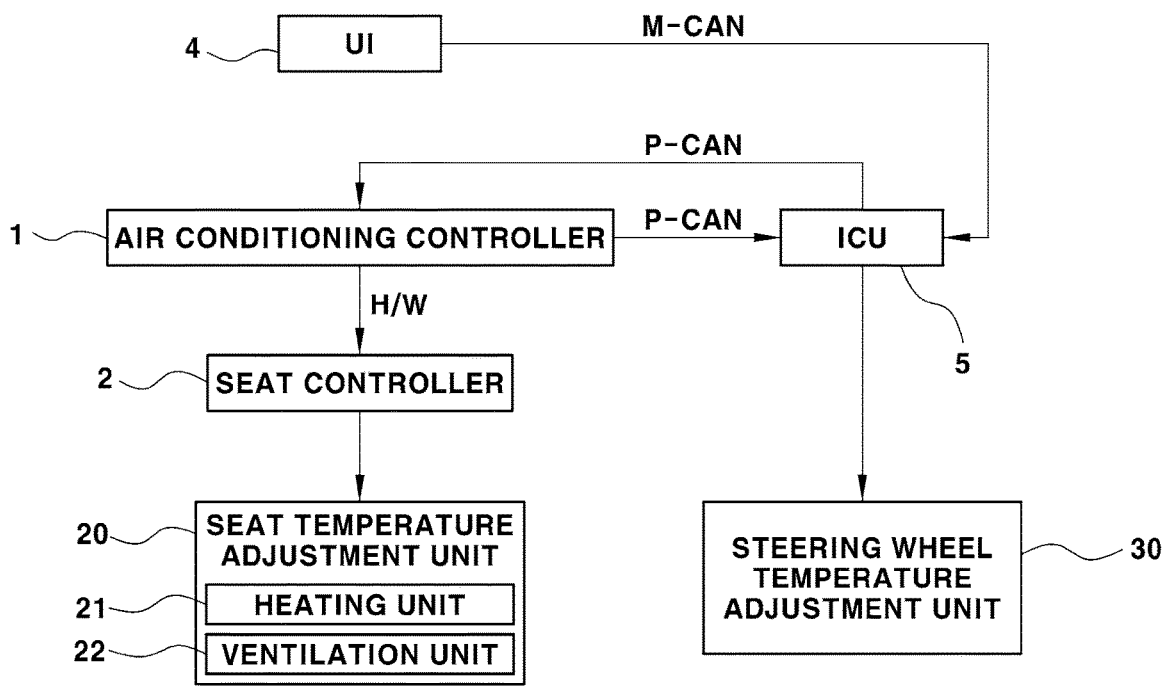
FIG. 2A, FIG. 2B, FIG. 2C and FIG. 3 are diagrams for describing a transmission method of a signal according to specifications of a seat controller.
Figure 2B:
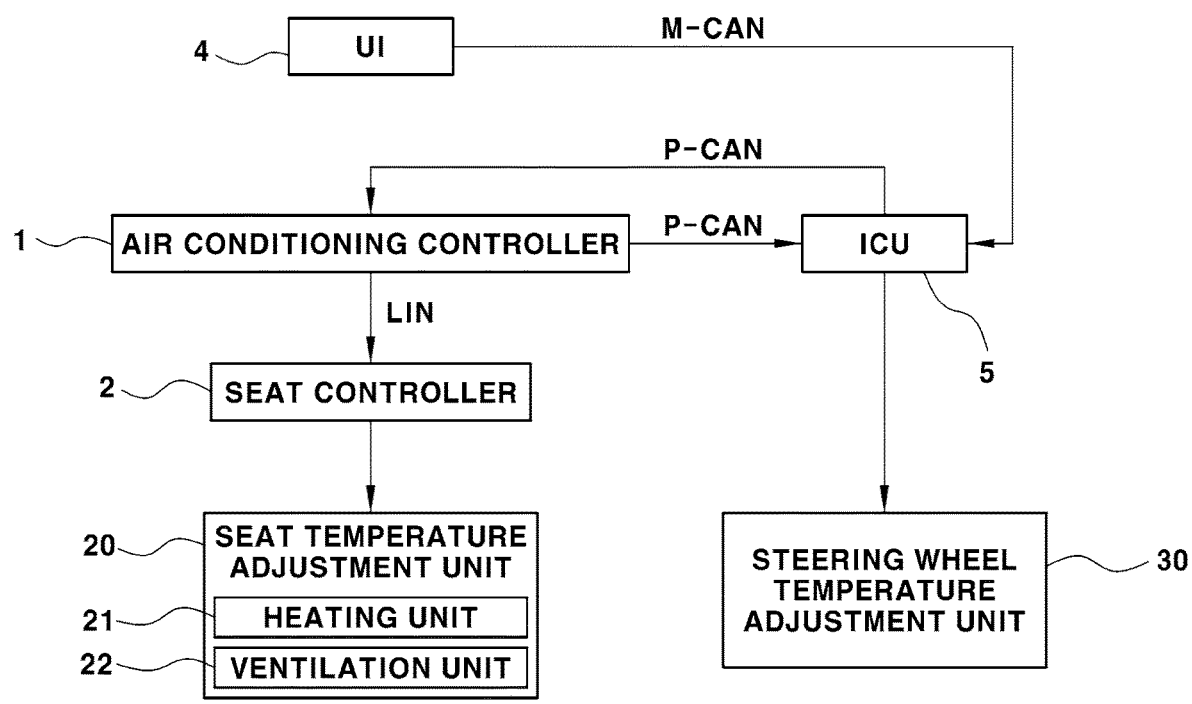
Figure 2C:
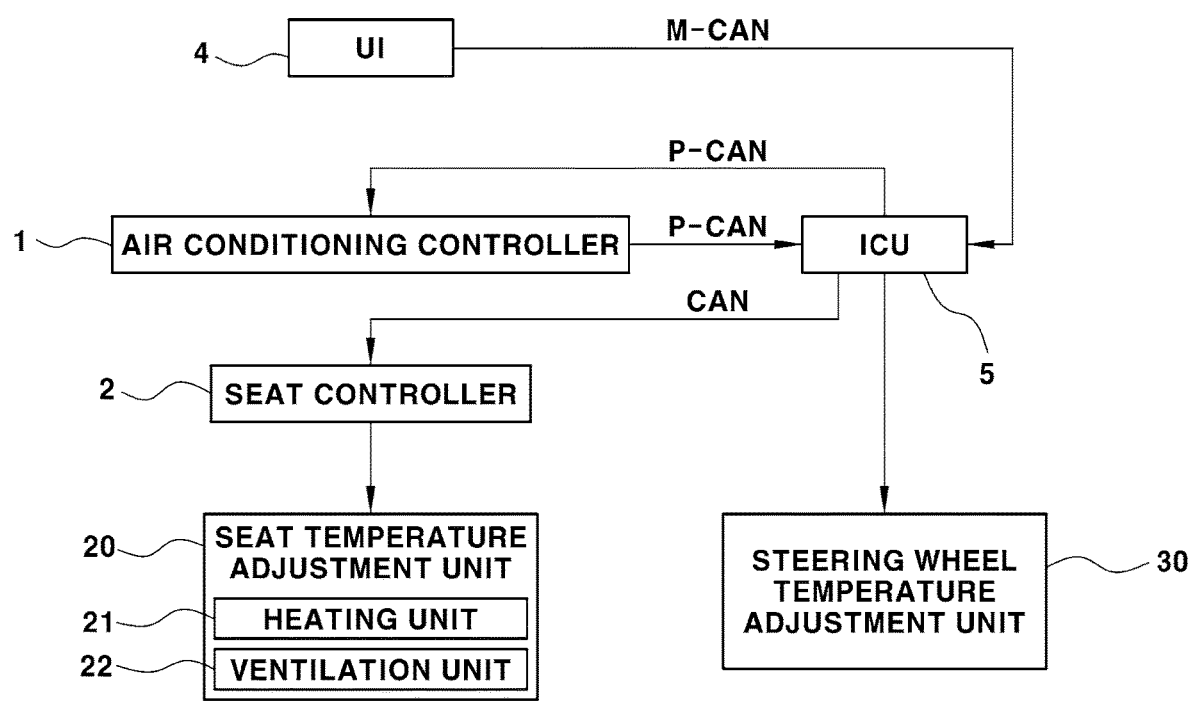

Meanwhile, transmission and reception methods of signals may be changed according to specifications of the seat controller 2 disposed at the vehicle. When the seat controller 2 may transmit and receive a signal to or from the air conditioning controller 1 through local interconnect network (LIN) communication or controller area network (CAN) communication of the vehicle, a request signal of the air conditioning controller 1 may be directly transmitted to the seat controller 2 through the LIN communication as shown in FIG. 2B, and alternatively, the request signal of the air conditioning controller 1 may be transmitted to the seat controller 2 via an in-vehicle integrated control unit (ICU) 5 through the CAN communication as shown in FIG. 2C. Alternatively, as shown in FIG. 2A, the request signal of the air conditioning controller 1 may be directly transmitted to the seat controller 2 through a hard wire (H/W) connected between the air conditioning controller 1 and the seat controller 2. That is, the request signal transmitted from the air conditioning controller 1 may be transmitted through wired communication or the H/W of the vehicle when being transmitted to the seat controller 2 and the steering wheel controller 3.

As shown in FIG. 2A, the ICU 5 receives signals input through the user interface unit 4 of the vehicle in real time via in-vehicle wired communication and transmits signals corresponding to operation-based signals of the air conditioning device 10 to the air conditioning controller 1. As such, the air conditioning controller 1 determines a required calorie index value on the basis of the received signals, determines an operation stage (operation stages of the air conditioning device 10 and the temperature adjustment units 20 and 30) on the basis of the required calorie index value, and transmits a signal (an operation request signal) for requesting an operation of the temperature adjustment unit 20 or 30 according to the determined operation stage to the seat controller 2 or the steering wheel controller 3. The user input signal among the operation-based signals is a signal which is input through the air conditioning manipulation module. Alternatively, the ICU 5 may be a controller into which the steering wheel controller 3 is integrated. The seat controller 2 or the steering wheel controller 3 receiving the operation request signal controls the operation stage of the seat temperature adjustment unit 20 or the operation stage of the steering wheel temperature adjustment unit 30 according to the operation request signal.

Figure 3:
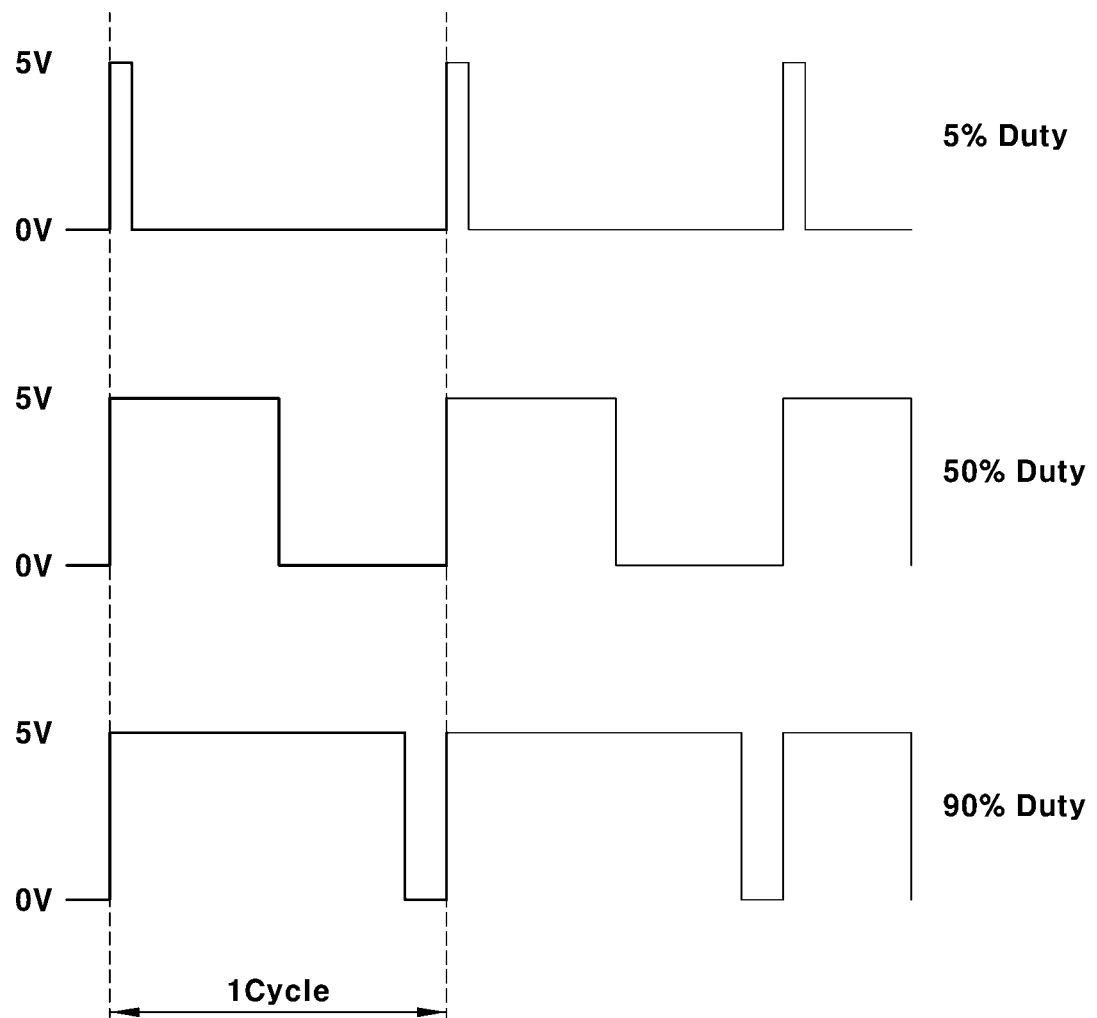

When the H/W is used, the number of H/Ws disposed between the air conditioning controller 1 and the seat controller 2 is determined by the number of signals which may be transmitted from the air conditioning controller 1 to the seat controller 2. For example, 14 H/Ws may be used. To reduce the number of H/Ws, pulse width modulation (PWM) control may be used. When the PWM control is used, two or more different signals may be simultaneously transmitted via a single H/W by differently controlling signal duty ratios of the two or more different signals through PWM (see FIG. 3). For example, when operation stages of the seat heating unit 21 requested by the air conditioning controller 1 are Stages 1, 2, and 3, operation stages of the seat ventilation unit 22 requested thereby are Stages 1, 2, and 3, and the seat temperature adjustment unit 20 is turned off, signals (operation request signals of the air conditioning controller 1) having different duty ratios may be transmitted to the seat controller 2 via or two H/Ws.

Meanwhile, when each of the temperature adjustment units 20 and 30 is in the manual control mode, the operation stage of the seat temperature adjustment unit 20 and the operation stage of the steering wheel temperature adjustment unit 30 are respectively determined by the seat controller 2 and the steering wheel controller 3. The seat controller 2 may receive the user input signal inputted through the seat manipulation module 41 via the ICU 5 and may determine the operation stage of the seat temperature adjustment unit 20 on the basis of the user input signal. Furthermore, the steering wheel controller 3 may receive the user input signal inputted through the steering wheel manipulation module 42 via the ICU 5 and may determine the operation stage of the steering wheel temperature adjustment unit 30 on the basis of the user input signal.

When each of the temperature adjustment units 20 and 30 is in the interlocked control mode, the seat controller 2 and the steering wheel controller 3 may respectively control the operation stage and the seat temperature adjustment unit 20 and the operation state of the steering wheel temperature adjustment unit 30 according to the operation request signal transmitted from the air conditioning controller 1. The operation request signal may include operation stage information according to the required calorie index value.

The required calorie index may be set in a non-volatile memory of the air conditioning controller 1 in a predetermined range of values (e.g., 0 to 100). A maximum value of the required calorie index may be divided into a plurality of equal values, the operation stage of the seat temperature adjustment unit 20 and the operation stage of the steering wheel temperature adjustment unit 30 may be respectively matched to a required calorie index corresponding to each of the plurality of equal values, and then the matched required calorie index may be stored in a memory of the air conditioning controller 1. That is, the operation stage according to the required calorie index value may be determined according to the stored value in the air conditioning controller 1. For example, an operation stage determination map for determining an operation stage according to a required calorie index value may be pre-built and stored in the memory of the air conditioning controller 1.

As described above, the operation stages of the seat temperature adjustment unit 20 and the steering wheel temperature adjustment unit 30, which are determined by the air conditioning controller 1, may be determined using the required calorie index value. For example, an entire range of the required calorie indexes is set to 0 to 1, and a maximum value of the required calorie index is divided into 16 equal values. As such, the operation stage of each of the seat temperature adjustment unit 20 and the steering wheel temperature adjustment unit 30 is matched for each of 16 required calorie indexes and is stored in the memory of the air conditioning controller 1. Furthermore, when the required calorie indexes are 1/16, 2/16, 3/16, and 4/16, which are determined on the basis of the operation-based signals of the air conditioning device 10, the air conditioning controller 1 transmits a signal (an operation request signal) for instructing the seat ventilation unit 22 to be operated at Stage 3 to the seat controller 2, and when the determined required calorie indexes are 5/16 and 6/16, the air conditioning controller 1 transmits a signal for instructing the seat ventilation unit 22 to be operated at Stage 2 to the seat controller 2, and when the determined required calorie index is 7/16, the air conditioning controller 1 transmits a signal for instructing the seat ventilation unit 22 to be operated at Stage 1 to the seat controller 2. Furthermore, when the determined required calorie indexes are 8/16 and 9/16, the air conditioning controller 1 determines that a vehicle internal temperature is stabilized based on a normal user body temperature and transmits a signal for instructing the seat temperature adjustment unit 20 and the steering wheel temperature adjustment unit 30 to be turned off (or to be operated at Stage zero) to the seat controller 2 and the steering wheel controller 3. When the determined required calorie index is 10/16, the air conditioning controller 1 transmits a signal for instructing the seat heating unit 21 to be operated at Stage 1 to the seat controller 2 and transmits a signal for instructing the steering wheel temperature adjustment unit 30 to be turned off (or to be operated at Stage zero) to the steering wheel controller 3. When the determined required calorie index is 10/16 or less, the air conditioning controller 1 transmits an OFF signal to the steering wheel controller 3. When the determined required calorie indexes are 11/16 and 12/16, the air conditioning controller 1 transmits a signal for instructing the seat heating unit 21 to be operated at Stage 2 to the seat controller 2 and transmits a signal for instructing the steering wheel temperature adjustment unit 30 to be operated at Stage 1 to the steering wheel controller 3. When the determined required calorie indexes are 13/16, 14/16, 15/16, and 16/16, the air conditioning controller 1 transmits a signal for instructing the seat heating unit 21 to be operated at Stage 3 to the seat controller 2 and transmits a signal for instructing the steering wheel temperature adjustment unit 30 to be operated at Stage 2 to the steering wheel controller 3.

When the air conditioning controller 1 is turned off, the required calorie index may be monitored by the ICU 5 in real time. Therefore, even though the air conditioning controller 1 is turned off, when the ICU 5 is turned on, the required calorie index determined according to the operation-based signals of the air conditioning device 10 may be monitored in real time. Furthermore, the ICU 5 may determine an operation stage according to the required calorie index to request an operation of the temperature adjustment unit 20 or 30 to the seat controller 2 or the steering wheel controller 3.

Meanwhile, when the interlocked control mode of each of the temperature adjustment units 20 and 30 is not selected by the air conditioning interlocking manipulation module 43 at a time when a starting of the vehicle is turned on, the seat temperature adjustment unit 20 and the steering wheel temperature adjustment unit 30 may be operated in the manual control mode. When the seat temperature adjustment unit 20 and the steering wheel temperature adjustment unit 30 are respectively set to the manual control mode at the time when the starting of the vehicle is turned on, i.e., a control mode of each of the temperature adjustment units 20 and 30 is the manual control mode immediately before the starting of the vehicle is turned off, when the starting of the vehicle is turned on again, the seat temperature adjustment unit 20 and the steering wheel temperature adjustment unit 30 are operated at operation stages (last operation stages set before the starting of the vehicle is turned off) which are set by the user through the seat manipulation module 41 and the steering wheel manipulation module 42. The temperature adjustment units 20 and 30 set in the manual control mode are operated according to the operation stages set by the user irrespective of the required calorie index determined by the air conditioning controller 1.

Furthermore, the seat manipulation module 41 may be configured such that the user separately controls a driver seat and an assistant seat (a passenger seat) (see FIG. 4). Furthermore, although not shown in the drawings, the seat manipulation module 41 may be configured to control operations of seat temperature adjustment units 20 disposed at not only a front seat but also a rear seat.

The user input signals, which are inputted through the user interface unit 4 (including the seat manipulation module 41, the steering wheel manipulation module 42, and the air conditioning interlocking manipulation module 43) are stored in a nonvolatile memory of the air conditioning controller 1, and the nonvolatile memory stores information related to previously input user input signals until a new user input signal is stored therein. The nonvolatile memory of the air conditioning controller 1 does not erase the user input signals even when the starting of the vehicle is turned off. Furthermore, a user input signal related to the control of the seat temperature adjustment unit 20 of the driver seat, a user input signal related to the control of the seat temperature adjustment unit 20 of the passenger seat, and a user input signal related to the control of the steering wheel temperature adjustment unit 30 may be separately stored in the nonvolatile memory.

Hereinafter, an example of an operation mechanism of the user body temperature assistance system of a vehicle, which is configured as described above, will be described with reference to FIG. 5.

Figure 5:
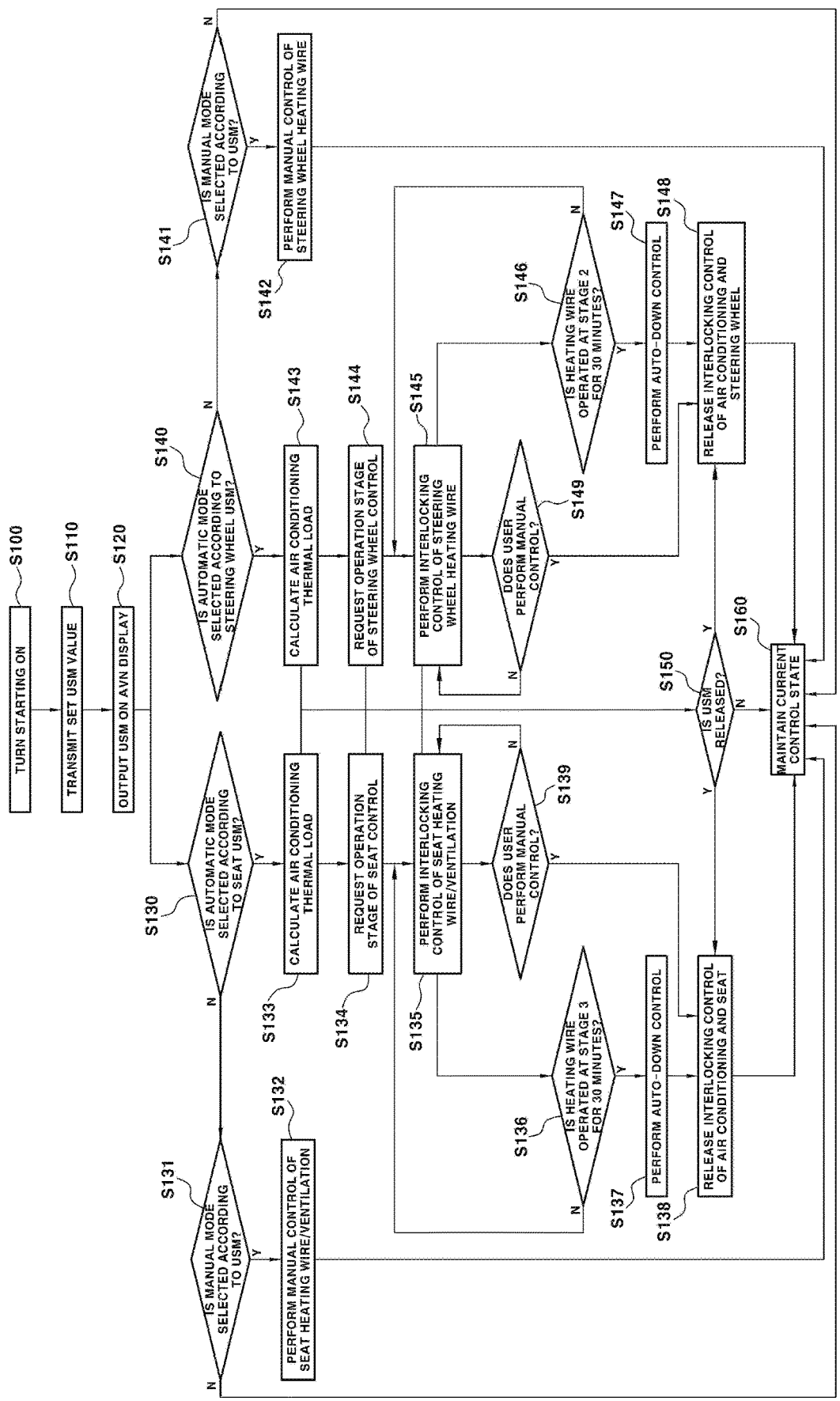
FIG. 5 is a flowchart illustrating an example of an operation mechanism of the user body temperature assistance system of a vehicle according to an exemplary embodiment of the present invention.

As shown in FIG. 5, the user body temperature assistance system activates when the starting of the vehicle is turned on (S100). Information on a control mode (information on a control mode of a temperature adjustment unit selected by the user through the user interface unit 4) of previous USM items, which are selected by the user before the starting of the vehicle is turned off, is stored in the nonvolatile memory of the air conditioning controller 1 and then, at the time when the starting of the vehicle is turned on again, is transmitted to the AVN system via wired communication of the vehicle (S110), and the transmitted information is output and displayed on the AVN display (the touch type user interface unit) together with the USM item (S120). When the user is willing to change the control mode, the user may change the control mode using the user interface unit 4.

In Operation S130, it is determined whether an interlocked control mode of the seat temperature adjustment unit 20 is selected among the USM items which are output and displayed on the AVN display. When the interlocked control mode among the USM items for the seat temperature adjustment unit 20 is not selected, it is determined whether a manual control mode is selected (S131). When the USM items for the seat temperature adjustment unit 20 are selected as the manual control mode or an OFF of the interlocked control mode is selected, the seat temperature adjustment unit 20 is controlled to be operated at an operation stage set by the user (S132). In the instant case, the user may input and set a desired operation stage (an operation stage of the seat temperature adjustment unit 20) through the seat manipulation module 41 of the user interface unit 4. The USM items are selectable and changeable by the user in association with the interlocking control between the air conditioning device 10 and the temperature adjustment units 20 and 30 and are output and displayed on the AVN display.

When the control mode of the seat temperature adjustment unit 20 is selected as the interlocked control mode, the air conditioning controller 1 determines a required calorie index (or which is called as an "air conditioning thermal load value") of the air conditioning device 10 (S133). Next, the air conditioning controller 1 determines the operation stage of the seat temperature adjustment unit 20 according to the required calorie index and requests the seat controller 2 to operate the seat temperature adjustment unit 20 according to the operation stage (S134). Subsequently, the seat controller 2 controls the operation of the seat temperature adjustment unit 20 according to the request of the air conditioning controller 1 (S135), and the seat temperature adjustment unit 20 is operated according to the operation stage.

In Operation S140, it is determined whether the interlocked control mode of the steering wheel temperature adjustment unit 30 is selected among the USM items which are output and displayed on the AVN display. When the interlocked control mode among the USM items for the steering wheel temperature adjustment unit 30 is not selected, it is determined whether a manual control mode is selected (S141). When the control mode of the steering wheel temperature adjustment unit 30 is selected as the manual control mode or the interlocked control mode of the steering wheel temperature adjustment unit 30 is turned off, the steering wheel temperature adjustment unit 30 is controlled to be operated at the operation stage set by the user (S142). In the instant case, the user may input and set a desired operation stage (an operation stage of the steering wheel temperature adjustment unit 30) through the steering wheel manipulation module 42 of the user interface unit 4.

When the USM item for the steering wheel temperature adjustment unit 30 is selected as the interlocked control mode, the air conditioning controller 1 determines a required calorie index of the air conditioning device 10 (S143). Next, the air conditioning controller 1 determines the operation stage of the steering wheel temperature adjustment unit 30 according to the required calorie index and requests the steering wheel controller 3 to operate the steering wheel temperature adjustment unit 30 according to the determined operation stage (S144). Subsequently, the steering wheel controller 3 controls the operation of the steering wheel temperature adjustment unit 30 according to the request of the air conditioning controller 1 (S145), and the steering wheel temperature adjustment unit 30 is operated according to the determined operation stage.

As described above, when the operation of the seat temperature adjustment unit 20 is controlled and the seat heating unit 21 is operated by being interlocked with the operation of the air conditioning device 10, it is determined that the seat heating unit 21 is operated at the determined operation stage (e.g., Stage 3) for a predetermined reference time (e.g., 30 minutes) or more (S136). When the seat heating unit 21 is operated at the determined operation stage for the predetermined reference time or more, the user may be burned by being exposed to heat at low temperature for a long period time from the seat heating unit 21. Accordingly, when the seat heating unit 21 is determined as being operated at the determined operation stage for the predetermined reference time or more, the seat controller 2 executes a fail-safe mode for the seat heating unit 21 to perform auto-down control for automatically descending the operation stage of the seat heating unit 21 by one stage (S137). After the auto-down control is performed, the interlocked control mode of the seat temperature adjustment unit 20 for interlocking the air conditioning device 10 and the seat temperature adjustment unit 20 is released according to the request of the seat controller 2 (S138). At the instant time, only the interlocked control mode of the seat heating unit 21 is released or the interlocked control modes of the seat heating unit 21 and the seat ventilation unit 22 are simultaneously released.

Furthermore, as described above, when the operation of the steering wheel temperature adjustment unit 30 is controlled and the steering wheel temperature adjustment unit 30 is operated by being interlocked with the operation of the air conditioning device 10, it is determined whether the steering wheel temperature adjustment unit 30 is operated at the determined operation stage (e.g., Stage 2) for a predetermined reference time (e.g., 30 minutes) or more (S146).

When the steering wheel temperature adjustment unit 30 is operated at the determined operation stage for the predetermined reference time or more, the user may be burned by being exposed to heat at low temperature for a long period time from the steering wheel temperature adjustment unit 30. Accordingly, when the steering wheel temperature adjustment unit 30 is determined as being operated at the determined operation stage for the predetermined reference time or more, the steering wheel controller 3 executes a fail-safe mode for the steering wheel temperature adjustment unit 30 to perform auto-down control for automatically descending the operation stage of the steering wheel temperature adjustment unit 30 by one stage (S147). After the auto-down control is performed, the interlocked control mode of the steering wheel temperature adjustment unit 30 for interlocking the air conditioning device 10 and the steering wheel temperature adjustment unit 30 is released according to the request of the steering wheel controller 3 (S148).

Furthermore, when a user input signal for controlling the operation of the seat temperature adjustment unit 20 is generated while the seat temperature adjustment unit 20 is controlled in the interlocked control mode to be interlocked with the air conditioning device 10, i.e., when the user input signal is input to the seat manipulation module 41 of the user interface unit 4, the control mode of the seat temperature adjustment unit 20 may be switched to the manual control mode. Accordingly, it is determined whether the user input signal is generated while the seat temperature adjustment unit 20 is operated in the interlocked control mode (S139). When the control mode of the seat temperature adjustment unit 20 is switched to the manual control mode by inputting the user input signal to the seat manipulation module 41, the interlocking control between the air conditioning device 10 and the seat temperature adjustment unit 20 is released (S138), and the seat temperature adjustment unit 20 is maintained at a current real-time operation stage (the latest operation stage in the interlocked control mode) by the seat controller 2 (S160). That is, the seat temperature adjustment unit 20 is maintained in the operation state (a current control state) at a point of time when the interlocking control is released. In other words, when the seat temperature adjustment unit 20 is switched to the manual control mode, the seat temperature adjustment unit 20 is maintained at the operation stage immediately before being switched to the manual control mode.

Furthermore, when the user input signal for controlling the operation of the steering wheel temperature adjustment unit 30 is generated while the steering wheel temperature adjustment unit 30 is controlled in the interlocked control mode to be interlocked with the air conditioning device 10, i.e., when the user input signal is input to the steering wheel manipulation module 42 of the user interface unit 4, the control mode of the steering wheel temperature adjustment unit 30 may also be switched to the manual control mode. Accordingly, it is determined whether the user input signal is generated while the steering wheel temperature adjustment unit 30 is operated in the interlocked control mode (S149). When the interlocked control mode is switched to the manual control mode by inputting the user input signal to the steering wheel manipulation module 42, the interlocking control between the air conditioning device 10 and the steering wheel temperature adjustment unit 30 is released (S148), and the steering wheel temperature adjustment unit 30 is maintained at a current real-time operation stage by the steering wheel controller 3 (S160). That is, the steering wheel temperature adjustment unit 30 is maintained in the operation state at a point of time when the interlocking control is released.

As such, while the seat temperature adjustment unit 20 and the steering wheel temperature adjustment unit 30 are operated in the interlocked control mode and are interlocked with the air conditioning device 10, it is determined whether the interlocked control mode is turned off and released (S150). When the interlocked control mode of the seat temperature adjustment unit 20 is released, the interlocking control between the air conditioning device 10 and the seat temperature adjustment unit 20 is released (S138), and when the interlocked control mode of the steering wheel temperature adjustment unit 30 is released, the interlocking control between the air conditioning device 10 and the steering wheel temperature adjustment unit 30 is released (S148). When the interlocked control mode is released, each of the seat temperature adjustment unit 20 and the steering wheel temperature adjustment unit 30 is maintained at the operation stage at the time when the interlocking control with the air conditioning device 10 is released (S160).

As such, when the interlocked control mode is set again by the user, Operations S130 and S140 of determining whether the interlocked control mode is selected are re-performed to repeat the subsequent Operations.

The user body temperature assistance system of the present invention, which is configured as described above, can automatically control the operations of the seat temperature adjustment unit 20 and the steering wheel temperature adjustment unit 30 according to a cooling load and a heating load of the air conditioning device 10 which controls cooling and heating of an interior of the vehicle, improving the convenience of the user in terms of a temperature and a ventilation adjustment of a seat and a temperature adjustment of a steering wheel.

For example, when the driver turns on a starting of the vehicle in winter season, operations of the seat temperature adjustment unit 20 and the steering wheel temperature adjustment unit 30 are automatically controlled according to factors such as an outdoor air temperature, an interior temperature, and a predetermined temperature of the air conditioning device 10 such that the convenience of the driver may be improved, and while driving, it is not necessary to manually change the operation stage of each of the seat temperature adjustment unit 20 and the steering wheel temperature adjustment unit 30 or to manually turn the seat temperature adjustment unit 20 and the steering wheel temperature adjustment unit 30 off and, when the interior of the vehicle is comfortable, the operation stages of the temperature adjustment units 20 and 30 are automatically controlled such that the driver can concentrate on driving.

Furthermore, when the interior of the vehicle is comfortable, the operation stages of the temperature adjustment units 20 and 30 are automatically controlled such that unnecessary power consumption may be minimized.

Furthermore, in the case of a vehicle driven by a motor driving force, the use of the air conditioning device 10 may be reduced and functions of the seat temperature adjustment unit 20 and the steering wheel temperature adjustment unit 30 may be utilized to secure the same level of comfort as the air conditioning device 10 such that power consumption of the air conditioning device 10, which is relatively large than power consumption of the temperature adjustment units 20 and 30, may be reduced to achieve an effect of increasing a mileage.

According to the user body temperature assistance system associated with an air conditioning device according to an exemplary embodiment of the present invention, operations of an in-vehicle seat temperature adjustment unit and an in-vehicle steering wheel temperature adjustment unit may be automatically controlled in conjunction with an air conditioning device such that convenience of the user may be improved in terms of a temperature and an air conditioning of a seat and a temperature adjustment of a steering wheel.

Although the exemplary embodiments of the present invention have been described in detail, the scope of the prevent invention is not limited to these embodiments, and various modifications and improvements devised by those skilled in the art using the fundamental concept of the present invention, which is defined by the appended claims, further fall within the scope of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A user body temperature assistance system associated with an air conditioning device, the user body temperature assistance system comprising:
an air conditioning controller configured to control an operation of the air conditioning device for adjusting an interior air temperature of a vehicle and to determine an operation stage of a temperature adjustment unit in the vehicle on a basis of an operation stage determination map stored in a memory of the air conditioning controller, in response to an operation-based signal of the air conditioning device; and
a temperature adjustment controller configured to control an operation of the temperature adjustment unit programmed to assist a body temperature of a user according to the operation stage determined by the air conditioning controller,
wherein the temperature adjustment unit includes a seat temperature adjustment unit, and
wherein the temperature adjustment controller includes a seat controller configured to control an operation of the seat temperature adjustment unit to adjust a temperature of a seat in the vehicle according to the operation stage determined by the air conditioning controller,
wherein the temperature adjustment unit includes a steering wheel temperature adjustment unit, and
wherein the temperature adjustment controller includes a steering wheel controller configured to control an operation of the steering wheel temperature adjustment unit to adjust a temperature of a steering wheel of the vehicle according to the operation stage determined by the air conditioning controller.

2. The user body temperature assistance system of claim 1, wherein the air conditioning controller is configured to determine a required calorie index value of the air conditioning device on the basis of the operation stage determination map stored in the memory of the air conditioning controller, in response to the operation-based signal and is configured to determine the operation stage of the temperature adjustment unit according to the determined required calorie index value,
wherein the air conditioning controller is configured to determine the required calorie index value corresponding to an operating load of the air conditioning device, and the required calorie index value of the air conditioning device is selected through a pre-built required calorie index determination map, and the required calorie index determination map is configured to determine the required calorie index value on the basis of the operation-based signal.

3. The user body temperature assistance system of claim 1,
wherein the seat temperature adjustment unit and the steering wheel temperature adjustment unit are controlled in either an interlocked control mode in which the seat temperature adjustment unit and the steering wheel temperature adjustment unit are controlled according to the operation stage determined by the air conditioning controller or a manual control mode in which the seat temperature adjustment unit and the steering wheel temperature adjustment unit are separately controlled according to a user input signal manually.

4. The user body temperature assistance system of claim 1, wherein the temperature adjustment unit is controlled in either an interlocked control mode in which the temperature adjustment unit is controlled according to the operation stage determined based on a required calorie index value of the air conditioning device or a manual control mode in which the temperature adjustment unit is manually controlled according to a user input signal.

5. The user body temperature assistance system of claim 4, wherein the manual control mode of the temperature adjustment unit is set through a user interface unit in the vehicle.

6. The user body temperature assistance system of claim 5, wherein the user interface unit includes an air conditioning interlocking manipulation module programmed to set or release an interlocking operation between the air conditioning device and the temperature adjustment unit.

7. The user body temperature assistance system of claim 6,
wherein the user input signal includes a first user input signal and a second user input signal, and
wherein the user interface unit further includes a seat manipulation module programmed to receive the first user input signal for manual control of the seat temperature adjustment unit and a steering wheel manipulation module programmed to receive the second user input signal for manual control of the steering wheel temperature adjustment unit.

8. The user body temperature assistance system of claim 1, wherein, when a control mode of the temperature adjustment unit is an interlocked control mode in which the temperature adjustment unit is controlled by being interlocked with operation of the air conditioning device, the temperature adjustment controller is programmed to control the operation stage of the temperature adjustment unit according to a request of the air conditioning controller.

9. The user body temperature assistance system of claim 8, wherein, when the control mode of the temperature adjustment unit is the interlocked control mode and a user input signal for controlling the operation of the temperature adjustment unit is generated, the temperature adjustment controller switches the control mode of the temperature adjustment unit to a manual control mode in which the temperature adjustment unit is manually controlled according to the user input signal.

10. The user body temperature assistance system of claim 9, wherein, when the control mode of the temperature adjustment unit is switched from the interlocked control mode to the manual control mode, the temperature adjustment controller maintains the operation stage of the temperature adjustment unit in the interlocked control mode.

11. The user body temperature assistance system of claim 1, wherein, when a control mode of the temperature adjustment unit before a starting of the vehicle is a manual control mode and the starting of the vehicle is turned on again, the temperature adjustment unit is controlled to be operated at an operation stage in the manual control mode.

12. The user body temperature assistance system of claim 8, wherein, when the temperature adjustment unit is operated in the interlocked control mode at a determined operation stage for a predetermined reference time or more, the temperature adjustment controller automatically descends the determined operation stage of the temperature adjustment unit by a predetermined stage.

13. The user body temperature assistance system of claim 1, further including:
an integrated controller configured for determining the operation stage of the temperature adjustment unit according to the operation-based signal of the air conditioning device, when the air conditioning controller is turned off.

14. The user body temperature assistance system of claim 1, wherein the operation-based signal of the air conditioning device includes a vehicle internal temperature, a vehicle outdoor air temperature, a temperature of an evaporator of the air conditioning device, a value of solar radiation, vehicle internal humidity, a pollution concentration of vehicle outdoor air, and a user input.

15. The user body temperature assistance system of claim 1, wherein the seat temperature adjustment unit includes a seat heating unit programmed to heat the seat and a seat ventilation unit programmed to ventilate the seat.

16. A user body temperature assistance system associated with an air conditioning device, the user body temperature assistance system comprising:
an air conditioning controller configured to control an operation of the air conditioning device for adjusting an interior air temperature of a vehicle and to determine operation stages of a temperature adjustment unit in the vehicle on a basis of an operation stage determination map stored in a memory of the air conditioning controller, in response to an operation-based signal of the air conditioning device; and
a temperature adjustment controller configured to control an operation of the temperature adjustment unit programmed to assist a body temperature of a user according to the operation stage determined by the air conditioning controller,
wherein the air conditioning controller is configured to determine required calorie index values of the air conditioning device on the basis of the operation stage determination map stored in the memory of the air conditioning controller, in response to the operation-based signal and is configured to determine the operation stages of the temperature adjustment unit according to the determined required calorie index values, wherein the air conditioning controller is configured to determine the required calorie index values corresponding to operating loads of the air conditioning device, and
wherein an entire range of the required calorie index values is set and a maximum value of the required calorie index values is divided into a plurality of equal values, the operation stages of the temperature adjustment unit are respectively matched to the required calorie index values corresponding to each of the plurality of equal values, and then the matched required calorie index values are stored in the memory of the air conditioning controller.

17. A user body temperature assistance system associated with an air conditioning device, the user body temperature assistance system comprising:
an air conditioning controller configured to control an operation of the air conditioning device for adjusting an interior air temperature of a vehicle and to determine an operation stage of a temperature adjustment unit in the vehicle on a basis of an operation stage determination map stored in a memory of the air conditioning controller, in response to an operation-based signal of the air conditioning device; and
a temperature adjustment controller configured to control an operation of the temperature adjustment unit programmed to assist a body temperature of a user according to the operation stage determined by the air conditioning controller,
wherein the air conditioning controller is configured to determine a required calorie index value of the air conditioning device on the basis of the operation stage determination map stored in the memory of the air conditioning controller, in response to the operation-based signal and is configured to determine the operation stage of the temperature adjustment unit according to a determined required calorie index, and
wherein the air conditioning controller is configured to determine the required calorie index value corresponding to an operating load of the air conditioning device, and the required calorie index value of the air conditioning device is determined through a pre-built required calorie index determination map, and the required calorie index determination map is configured to determine the required calorie index value on the basis of the operation-based signal.

* * * * *